United States Patent [19]

Tsutsumi

[11] 3,791,321
[45] Feb. 12, 1974

[54] AUTOMATIC PLANTING SYSTEM
[75] Inventor: Masato Tsutsumi, Kahului, Hawaii
[73] Assignee: Maui Land & Pineapple Company, Inc., Kahului, Maui, Hawaii
[22] Filed: Apr. 5, 1972
[21] Appl. No.: 241,349

[52] U.S. Cl. ............................................ 111/3, 47/9
[51] Int. Cl. ............................................ A01c 11/00
[58] Field of Search ............... 111/2, 3; 47/9; 280/14

[56] References Cited
UNITED STATES PATENTS

| | | | |
|---|---|---|---|
| 2,890,665 | 6/1959 | Kang | 111/3 |
| 1,787,902 | 1/1931 | Herfort | 47/9 |
| 3,107,637 | 10/1963 | Saifuku | 111/3 |
| 3,180,290 | 4/1965 | Kapplemann et al. | 111/2 X |
| 3,176,635 | 4/1965 | Mabon | 47/9 X |
| 3,234,691 | 2/1966 | Cowell | 47/9 |
| 3,353,297 | 11/1967 | Gervais | 47/9 X |
| 3,460,493 | 8/1969 | Stephanson et al. | 47/9 X |
| 3,559,599 | 2/1971 | Hoadley | 47/9 X |

Primary Examiner—Stephen C. Pellegrino
Attorney, Agent, or Firm—Charles G. Lyon

[57] ABSTRACT

A system for automatically planting pineapple plants or the like combining into a single continuous operaton the steps of applying fertilizer and fumigants to the soil, laying mulch paper on the ground and planting the plants either as crowns, slips or suckers. The apparatus, which includes two independent planting machines, lays the plants in multiple rows having crowned beds separating the rows. Because the configuration of the machines, they can accommodate varying terrain and differing grades as well as curving the rows without difficulty. Pre-punched mulch paper is fed from a roll over a supporting deck where individual plants are inserted by hand through the hole in the paper. The deck is provided with channels to accommodate the stub ends of the plants. The deck is slanted toward the ground and the channels extend to form plow shares whereby the mulch paper with the plants inserted is fed toward the ground off the back of the plowshares so that the point of plant insertion into the soil is located immediately behind the plow where the furrows are open. The apparatus is coupled to a prime mover at one end and supported by a number of drive wheels at the other, the wheels of each machine being differentially powered by an hydraulic system whereby the wheels are always driven at a ground speed equal to that of the prime mover. The wheels supporting the back end of the machines properly gauge the plows to give uniformly deep furrows regardless of any unevenness of the terrain and the wheels are so spaced as to engage the mulch paper strips along the edges thereof to drive out the paper at actual ground speed. The supporting wheels also form a tuck on the edge of the paper and compact the soil around the seeds. Tuck improves paper covering. A floating set of driven moon wheels mounted at the back end form the crowned beds between the rows and compact the soil around the plants. Presser wheels are also provided to assure proper insertion of the plants into the furrows.

24 Claims, 11 Drawing Figures

AUTOMATIC PLANTING SYSTEM

BACKGROUND OF THE INVENTION

This invention relates generally to a system for mechanically planting young plants, and while it was principally developed for the planting of pineapples and will be described hereinafter in that connection, it is contemplated that the invention may also be useful in the planting of other crops such as tomatoes, sugar cane or the like wherein slips, suckers or crowns are inserted at spaced intervals through sheets of thin material used for mulching purposes whereupon the material with the plants inserted therein is laid upon the ground.

Hand planting of pineapple plants is practiced today because mechanical planting machines heretofore developed have not proven to be economically successful, either because of excessive cost or because of several objectionable results obtained thereby. In the hand planting operations, it is the practice to first prepare the field by proper plowing and harrowing whereupon fertilizers and fumigants are injected into the soil and mulch paper is laid in long strips forming the rows of planting beds. Usually, it is the practice to perform these two steps at the same time, fertilizing and fumigating the soil as the strips of mulch paper are laid in the field. Then, individual workers are sent to the fields and they punch holes through the mulch paper and insert the slips into the soil by hand using a small pointed instrument. This must be done in a bent over posture which is very uncomfortable and tiring for the workers, and is not only most tedious but unpleasant in that the laborers are working where it is either hot and dusty under dry conditions or very muddy and sticky under wet conditions. It is becoming exceedingly difficult to find laborers who will work under these conditions and as a result the costs of planting a field have become excessive. In addition, a sufficient number of laborers is not available to do the planting in a timely fashion to achieve proper plant growth.

Efforts to design mechanical planting devices have been going on for in excess of twenty years but failure of the invesigators to produce a satisfactory mechanical planter are evidenced by the fact that none of them are in use to this day. One such effort was a device developed by Lawrence S.C. Kang and disclosed in his U.S. Pat. No. 3,020,859 patented Feb. 13, 1962. The shortcomings of this apparatus were many. The furrow opening plows did not operate properly and the soil caved in before the plants were properly inserted. The manner in which the mulch paper was applied to the ground was ineffective, the sliding of the pontoons upon the paper usually ripped the paper open and also interferred with the plants when they were placed. The manner in which the machine was supported on the surface of the soil did not permit it to compensate for even slight differences in terrain and there were no means for properly controlling the depth to which the furrows were made. The machine developed by Kang also had a crabbing action on turns or slight slopes causing the planter to run over the previous plants or tear the paper. The machine was particularly inefficient if the planting beds were to be curved which is usually the case. In addition, the Kang machine had no provision for forming a crowned bed which is very advantageous in enhancing plant growth. A further shortcoming of the Kang machine was that it could not be lifted away from the soil for ease of transporting it to the field or for turning at the end of the planting row. Kang's machine would not lay the thin polyethlene mulch paper in use today without excessive stretching or breaking the paper. Stretch will change plant spacing and also will enhance deterioration of the paper long before its designed life. Kang experimented with heavy asphalt saturated paper and with some kind of corrugated cardboard material. It is also noted that the Kang machine is limited to a device which will plant one bed at a time because of its inability to properly clear the plants as they are laid upon the ground and in addition because the operators which feed the plants to the mulching paper are stationed at the side of the machine. In order to adapt the machine to a two bed planter it would be necessary to increase the spacing between beds which would unnecessarily expand the width between beds and therefore decrease the plant density per acre. Securing two machines side by side supported by a rear axle in the manner shown by Kang would necessarily restrict the machine to a straight-ahead operation and seriously affect its ability to follow ground terrain.

Other efforts to produce a successful and practical planting machine for pineapples have been almost as discouraging as that of Mr. Kang. Difficulties encountered have been that they were too slow, unable to handle uneven terrain, unable to work on other than a modest grade, unable to lay other than a substantially straight line, high cost, improper placement of plants in the soil, tearing of the mulch paper, requirement for exceptionally smooth and clod-free soil conditions, requirement for specially selected seed types, and inability to compact soil around the seed pieces particularly under plastic soil conditions. All of these problems have been solved by the present invention.

SUMMARY OF THE INVENTION

It is the principal object of the present invention to provide a system which successfully overcomes the time and expense disadvantages of hand planting as well as those shortcomings of previously attempted automatic planting machines. Specifically, it is an object of the present invention to provide an apparatus which is both simple and inexpensive and which saves time, labor and money while placing a maximum number of plants per acre more efficiently and economically than heretofore accomplished. It is a particular object of the present invention to provide a complete planting system which combines all of the planting procedures into one continuous operation, after the field has been plowed and prepared for planting, including the application of fumigants and fertilizers to the soil, the preparation and shaping of the seed beds, the application of the mulch paper, the insertion of the plants into the soil and the firming of the soil about the plants after they are placed. It is also an object of the present invention to provide a device which accomplishes the foregoing objects while having the capability of operation over varying terrain conditions and relatively steep slopes as well as being able to efficiently follow the terrain conditions to lay the seed beds in other than straight lines.

The foregoing objects and advantages of the present invention are accomplished by providing an apparatus which carries a large hopper of pineapple plants in the form of slips, crowns or suckers, the hopper being provided with a feed mechanism which also includes means for separating the plants from one another. The plants are then delivered to hoppers where they are then delivered to individuals riding upon two independent planting machines which travel side-by-side. Pre-punched mulch paper is delivered over feed tables provided with a plurality of channels and the plants are inserted by hand. The mulch paper is then fed down the incline of the feed tables and over the rear edge of furrow forming plows. Immediately behind the back edge of the plows are a pair of driven supporting wheels supporting each machine which engage the outer edges of each strip of mulch paper. These supporting wheels are driven by hydraulic means having their principal source of power derived from a power take off mechanism driven by the prime mover to which the planting machines are connected whereby the supporting wheels of the planting machines are driven at the actual ground speed of the prime mover. In this manner, the drive wheels which support the planting machines drive the mulch paper out of the machines at the same ground speed at which the planting machines move over the soil. Immediately behind the prime mover are a number of plow shanks through which fumigants and fertilizer are injected into the soil in alignment with each of the seed beds. Between the pairs of driven supporting wheels there is a floating moon wheel having a concave surface which forms a crown for the seed bed and also compacts the soil around the plants. On each side of the moon wheel and between the two driven wheels are presser wheels which are aligned with the channels and which ride over the plants as they are carried into the ground and these presser wheels assure proper insertion of the plants into the furrows.

In addition to the foregoing objects, further objects and advantages of the present invention will become readily apparent to those skilled in the art upon reading the ensuing detailed description in conjunction with the accompanying drawings.

DESCRIPTION

The various components of the apparatus which make up the planting system are mounted upon a prime mover generally designated 10 in the drawings. For the prime mover I have used a Caterpiller Model D5 for the production prototype, appropriately modified as hereinafter described to accommodate the various extra equipment. Upright equipment brackets 12 (two in number) are mounted to the rear of the prime mover 10 and forward equipment brackets 14 are likewise mounted thereto. An overhead seed bin 16 is mounted above the prime mover upon supports 17 and 18 mounted to the rear equipment brackets 12 and legs 20 mounted to the front equipment brackets 14. The seed bin 16 has two compartments 21 and 22 each of which is provided with a longitudinal conveyor 24 with a conveyor drive means 26. At the rear of each compartment 21 and 22 there are provided seed elevators 27 and 28. These elevators each consist of a plurality of longitudinal cross members 30 each having a plurality of fingers 32 and a drive chain 34 running over pulleys 36 and 38. Drive chains 34 are driven by hydraulic motors (not shown) mounted on the sides of the brackets 40. Another set of hydraulic motors drive the conveyors 24 mounted inside the bracket 18. In the elevator mounting bracket 40 there is also mounted a seed singulator 42 having a plurality of curved fingers 44 which rotate counterclockwise (in FIG. 1) and these fingers 44 operate to separate the individual pineapple plants which usually tend to cling together. Also mounted on bracket 40 is seed chute 46 pivotally mounted at 48 which extends downwardly and rearwardly to a pair of individual seed hoppers 50. The chute is one piece with dividing partitions to each hopper. The chute 46 is supported on the upper and the outside edges of the hoppers 50 on lateral pins 52 resting upon a track 54 and are retained in that position by a retaining bar 56. In this manner, when the planting machine is pivoted upwardly to clear the ground, as will be more fully explained in connection with FIG. 11, the retention of the lateral pins 52 on the track 54 permits the chutes 46 to pivot upwardly but remaining in engagement therewith. This also allows the two machines to move independently of each other.

To the rear equipment brackets 12 is mounted a lateral tool bar 58 by means of brackets 60. Brackets 60 are pivotally mounted to the rear equipment brackets 12. A U shaped bracket 62 is mounted to the tool bar 58 at each of four locations, brackets 62 being pivotally mounted upon a vertical pin 64 extending through the tool bar 58. Actually, the bracket 62 consists of two pieces 62a and 62b between which is firmly mounted the plow shank 66. Two hydraulic cylinders 68 each have one end pivotally coupled to the equipment brackets 12 and the other end coupled to the lateral tool bar 58.

Figure 1:
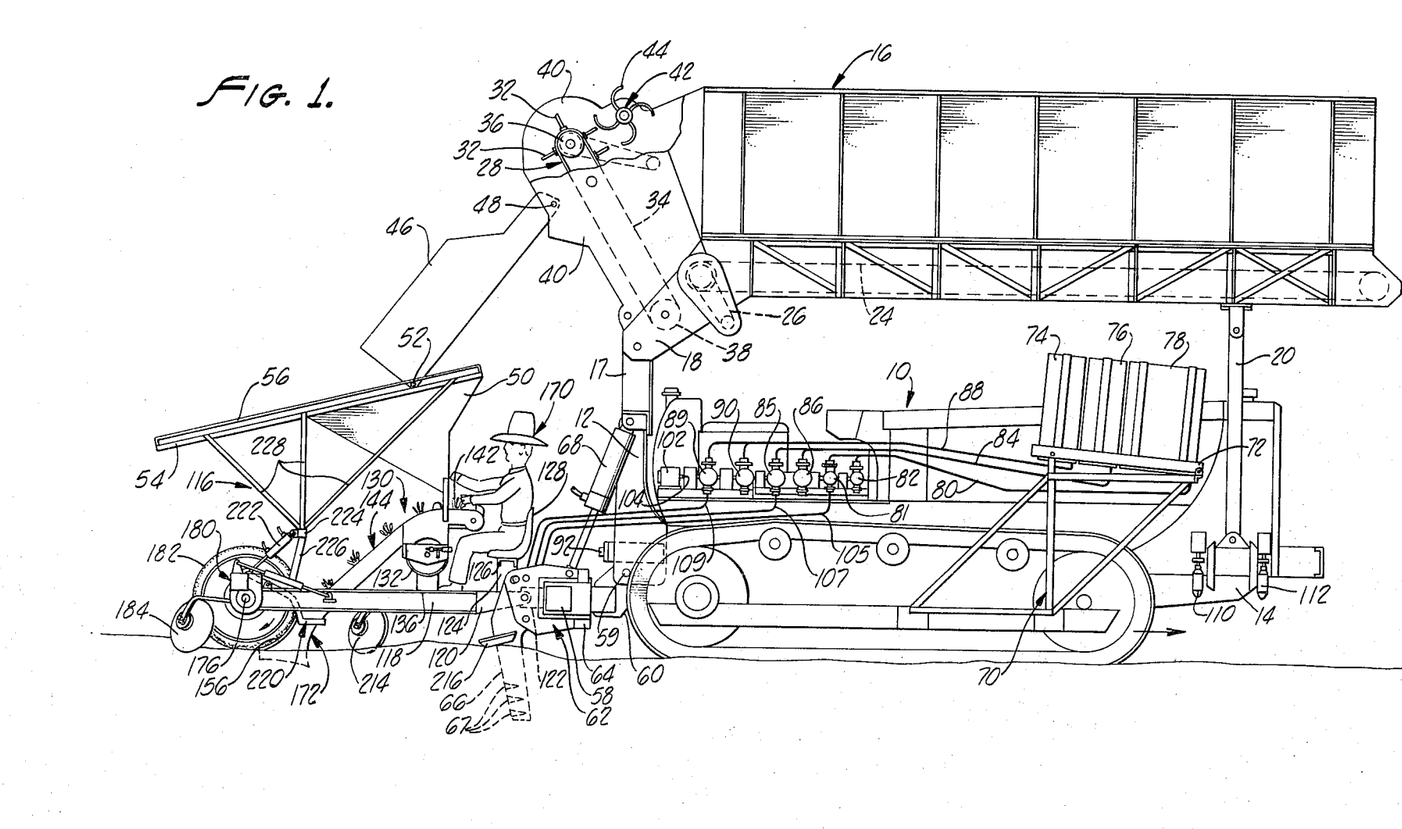
FIG. 1 is a side elevation of the complete planting system attached to a prime mover.
Figure 2:
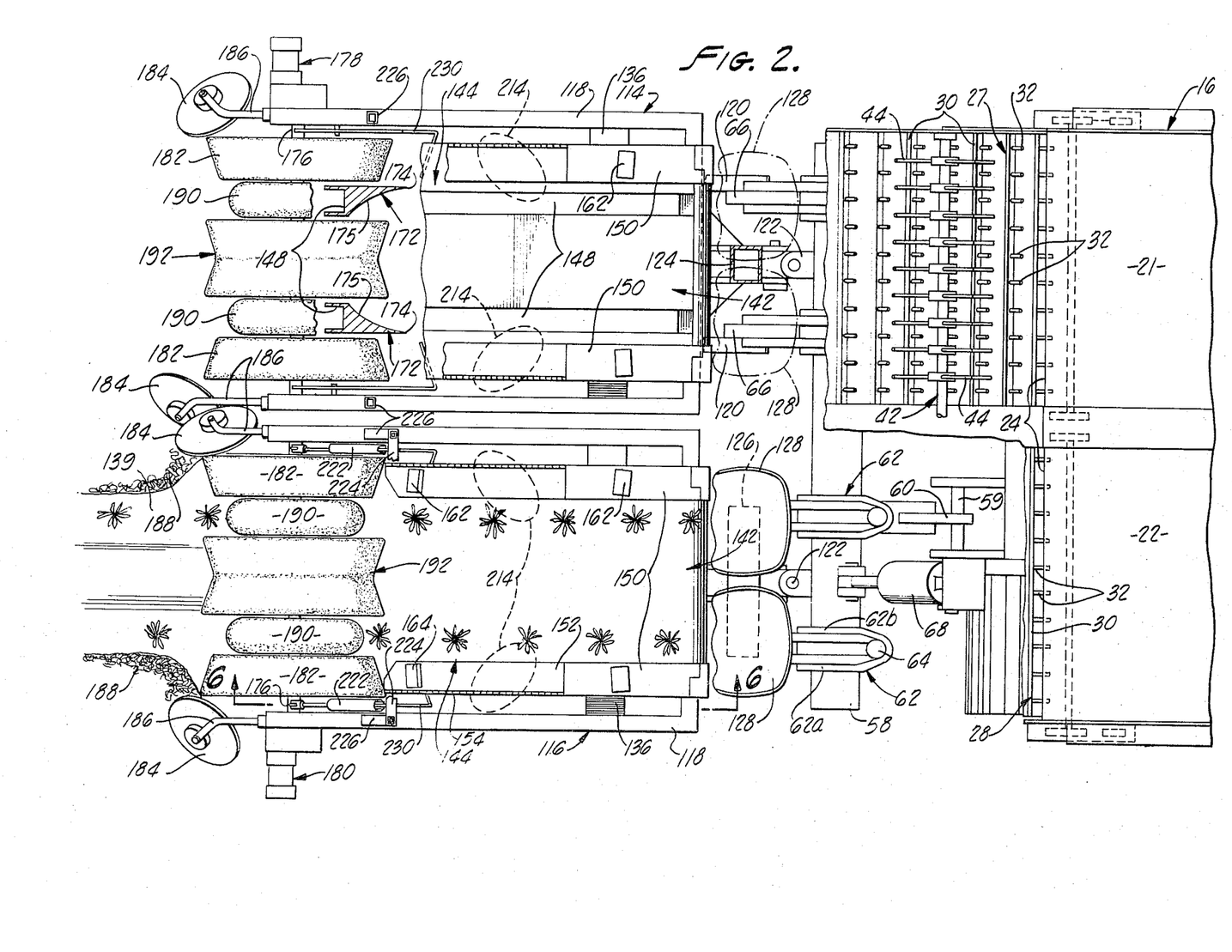
FIG. 2 is a partial plan view of the apparatus slightly enlarged over that shown in FIG. 1, and partially in section.

A bracket 70 is mounted at the forward end of the prime mover and supports a platform 72 upon which are mounted three tanks 74, 76 and 78. Tanks 74 and 76 contain fumigant material such as Telone and BBC. Tank 78 may be adapted to contain liquid fertilizer. On the other side of the prime mover mounted upon a similar bracket and platform assembly (not shown) is a similar tank (not shown) which serves as an hydraulic fluid reservoir. The tank on the other side of the prime mover could serve as the liquid fertilizer reservoir and tank 78 could be the hydraulic fluid reservoir if desired. For ease of illustration, FIG. 1 shows tank 78 as containing the liquid fertilizer. Tank 78 has a conduit 80 connected thereto which is coupled to two metering pumps 81 and 82 on the near side and two similar pumps on the far side (not shown). Tank 76 has a conduit 84 connected thereto which couples to two metering pumps 85 and 86 on the near side and two similar pumps on the far side (not shown). Tank 74 has a conduit 88 coupled thereto which connects to two metering pumps 89 and 90 on the near side and two similar pumps on the far side (not shown). Three hydraulic pumps 92, 92A and 92B are mounted at the rear of the prime mover and are driven by a ground speed take off mechanism (not shown) coupled to the drive train of the prime mover so that the pumps are powered only when the prime mover is actually moving. Variable displacement pump 92 drives the supporting, presser and moon-wheels, positive displacement pumps, 92A and 92B, drive the two sets of chemical metering pumps located at each sides of the prime mover. There are twelve metering pumps, six on each side of the prime mover. Each pump is plumbed individually to each outlet on each shank. There are three outlets on each shank and four shanks providing twelve outlets. Two hydraulic drive motors 102 have drive shafts 104 which drive the metering pumps 81, 82, 85, 86, 89 and 90 respectively on the near side and similar pumps on the far side (not shown). Metering pumps 81, 85 and 89 have conduits 105, 107 and 109 respectively connected thereto and coupled to one of the two plow shanks 66 on the right side of the apparatus as the apparatus is viewed in FIG. 2. The other metering pumps 82, 86 and 90 have similar conduits connected to the other plow shank 66 of the right side apparatus. The six other metering pumps on the far side (not shown) are coupled to the two plow shanks on the left half of the apparatus in a similar manner. Each of the plow shanks 66 is provided with outlet apertures 67 each of which are coupled to the fluid conduits previously mentioned and which provide outlets for the injection of fumigants and liquid fertilizer below soil level. The liquid chemical system storage tanks are of sufficient size to allow continuous operation of the chemical system through a predetermined number of seed filling cycles. The seed storage bin 16 in the prototype unit was approximately 4 feet high by 9 feet wide by 15 feet long providing a capacity to carry approximately enough seed to supply half an acre to three-fourths acre of seed. Additional chemical booster pumps 110, 112 and 112A (not shown) are mounted upon the front equipment brackets 14 which recirculate the chemicals, and are also coupled into the chemical lines 88, 84 and 80 respectively to supercharge the metering pumps.

That portion of the apparatus which does the actual planting consists of two identical machines 114 and 116 which are stationed in side-by-side relationship behind the prime mover 10. Each consists of a horizontally positioned U shaped frame member 118, the arms of the U extending rearwardly. The base of the U shaped frame member is secured through a shank 120 to the lateral tool bar 58 by means of a universal joint 122. Joint 122 permits each machine to pivot freely and independently behind the prime mover in both the lateral and vertical directions. In this manner, each machine is independently able to compensate for changes in terrain. The machines have bumpers which restrict the planting beds from getting too close to each other and a loose tie chain which restricts them from getting too far from each other. This feature also minimizes the crabbing action which commonly occurs when working along side slopes. On each shank 120 is mounted a vertical post 124 having a cross member 126 at the top thereof upon which is mounted a pair of seats 128 facing the rear of the apparatus.

Figure 6:
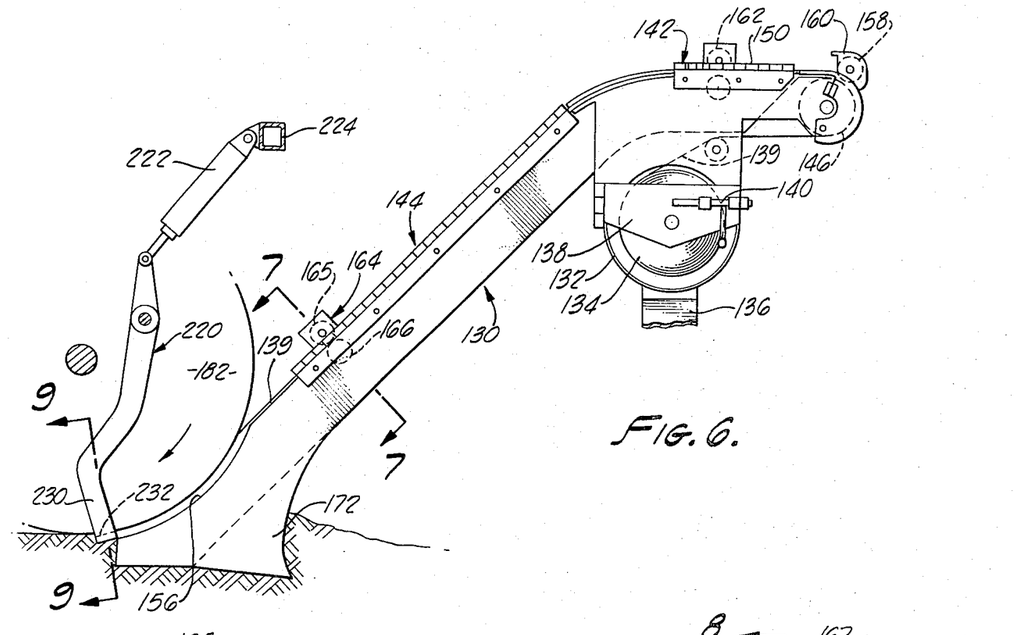
FIG. 6 is an enlarged partial detail view taken along line 6—6 of FIG. 2 of the feed table and furrow-forming plow showing the relationship thereof to the driven supporting wheels.

Mounted upon each of the U shaped frames 118 is a feed table 130 beneath which is situated an open cylindrical housing 132 adapted to contain a roll of mulch paper 134. A supporting leg 136 supports the feed table at the forward end of the frame 118 and extends from housing 132 to the frame 118. The outermost end of housing 132 is provided with a hinged gate (see FIG. 6) having a latch 140 by which it is locked in a closed position. In order to easily load the housing 132 with a roll of mulch paper, gate 138 is merely unlatched and opened and the roll inserted therein. Feed table 130 has an upper loading deck generally designated 142 and a ramp section generally designated 144 which slopes downwardly toward the rear of the apparatus. At the forwardmost end of the feed table is mounted a roller 146.

The mulch paper 139 preferably used is a polyethylene plastic material, black in color, having a film thickness of approximately fourteen tenthousandths of an inch, is approximately 38 inches wide and is prepunched with 2⅜ inch diameter holes 12 inches apart in the longitudinal direction and spaced inward from the outer edges of the strip approximately 9½ inches so that the spacing between the rows of punched holes is about 19 inches. The holes in the two rows are staggered. The feed table has a pair of channels 148 provided therein having a rectangular configuration as may best be seen in FIG. 7. The depth of these channels provides a means for gauging the amount by which the plants are inserted through the mulch paper.

Figure 7:
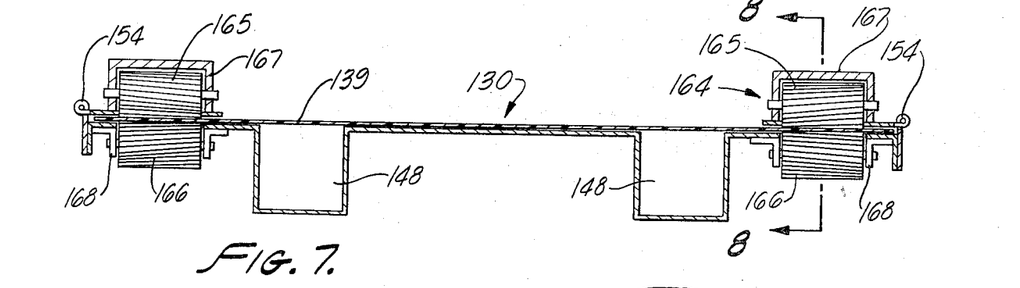
FIG. 7 is a sectional view taken along line 7—7 of FIG. 6 showing the configuration of one of the feed tables.
Figure 8:
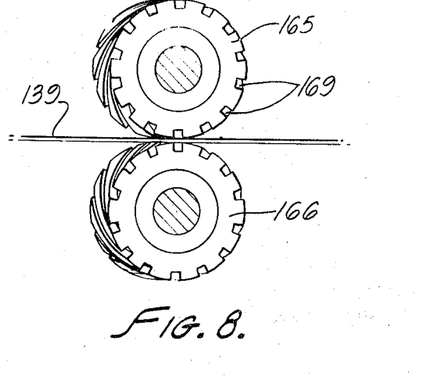
FIG. 8 is a sectional view taken along line 8—8 of FIG. 7 of the paper stretching rollers.

In the substantially horizontal loading deck 142 the edges of the feed table are provided with hinged edge covers 150. In the ramp section 144, edge covers 152 are also attached to hinges 154 to the outer most edges of the feed table. These hinged edge covers facilitate the initial loading of the feed table with the mulch paper. The rearmost extension of the feed table channels has an arcuate edge 156 for reasons which will be explained subsequently. Adjacent the roller 146 is positioned a hold down roller 158 mounted in a housing 160. In the loading deck area 142 is a pair of pinch rollers 162 and a second pair of pinch rollers 164 is mounted in the ramp area 144. Referring to FIG. 7, it will be seen that the pinch rollers 164 consist of two cylindrical rollers 165 and 166 supported above and below the feed table in brackets 167 and 168 respectively mounted on a slight angle with respect to the major dimension of the table and each of the rollers is provided with a plurality of spirally oriented splines 169 which are oriented in the manner shown in FIG. 7. This orientation of splines and the angularly mounted rollers tend to pull or stretch the mulch paper 139 laterally as it passes down the feed table so that it remains tightly stretched across the table and does not bunch up. The plants after being injected will remain situated properly in the channels 148. Further, the pinch rollers 162 located adjacent the loading deck 142 operate to stretch the paper laterally which is important inasmuch as in this area the operators 170 who are positioned on the seats 128 manually pick the plants from the hopper 50 and insert them through the aforementioned prepunched holes in the mulch paper 139 at the loading deck 142. Tautness of the paper in the loading area facilitates this insertion procedure.

Each of the channels 148 are extended at their lowermost end to form the furrow-forming plow shares 172. The configuration of these plow shares 172 can best be seen by the cross sectional view appearing in FIG. 2 in the left hand portion thereof where a cross sectional view has been taken along a plane substantially parallel to the ground surface. The configuration of the plow shares provides a leading edge 174 which is the cutting edge or colter of the plow with a curved inner surface 175 which acts to move the soil aside to form the furrow. By so extending the channels of the feed table to form the plow shares 172 it has been found that the point of insertion of the plants into the soil will be at a point where the furrows in the soil are the most open, and as the plow shares move forward through the soil, the soil will be sucked in behind the plow shares further pulling the plant downwardly into the soil assuring proper placement. This action can be seen when pulling a ripper shank thru the soil where the displaced dirt flows back into the cavities made by the shank.

Figure 3:
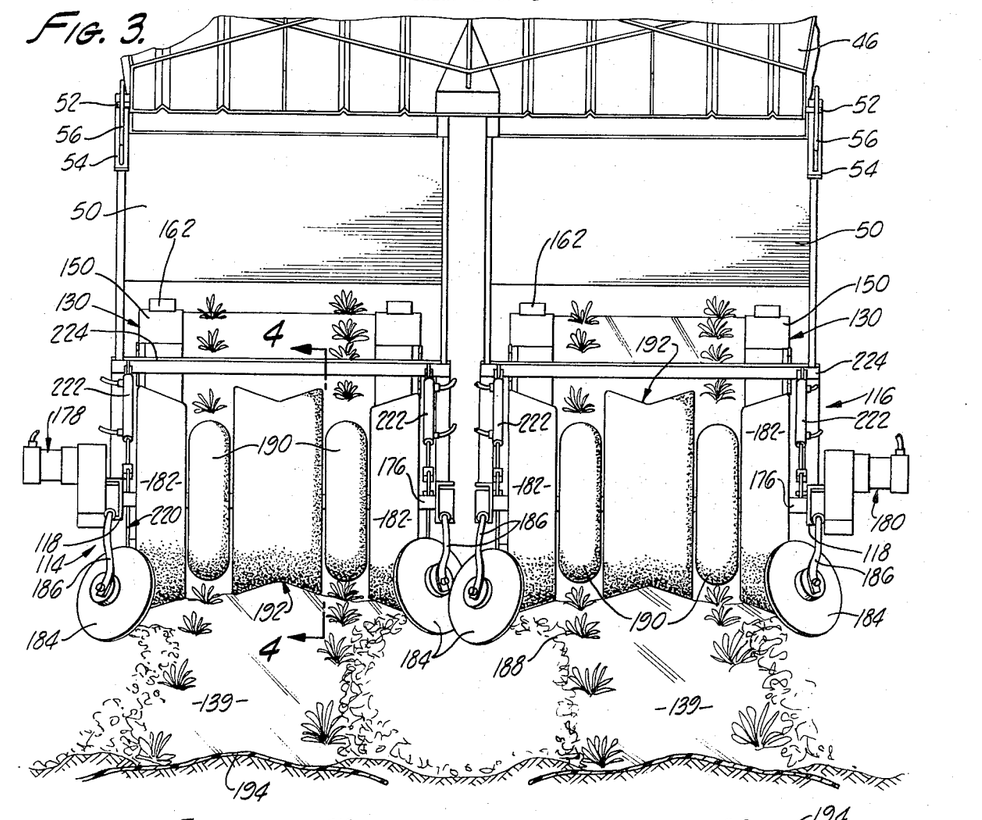
FIG. 3 is a partial rear elevation view showing the two planting machine sections and the manner in which the plants are laid in the soil.

At the rearmost end of each frame 118 is mounted a laterally oriented axle 176 which is suitably journaled in the frame member. Upon each of the planting machines 114 and 116 on the outboard portions of the frame 118 there are mounted hydraulic drive motors 178 and 180 respectively. Each of the drive motors is coupled to its respective axle shaft 176. Immediately inboard of the frame 118 and secured to axle shaft 176 are a pair of supporting wheels 182. These supporting wheels 182 are shown herein as having an angular peripheral surface. The lateral position of tires 182 is such that they are aligned so as to overlap the outermost edges of the mulch paper 139 as the mulch paper extends down the back surface of the feed table and under the supporting tires 182 and onto the ground performing a tuck on the edge of the paper and compacting the soil around the seeds. As the tires 182 rotate, they operate to pull the mulch paper out of the roll 134 down the feed table and onto the ground. A pair of disc plows 184 are mounted by means of angle brackets 186 on the extreme ends of the frames 118 and these discs 184 are so positioned as to deflect soil 188 over the edges of the mulch paper as the apparatus moves forwardly, covering the edges of the mulch paper to hold it in position after the supporting wheels 182 have passed thereover. In this manner, the edges of the mulch paper are covered as the apparatus moves forward in the manner shown in FIG. 3. The curved rear surfaces 156 of the channels 148 are provided in such a configuration so as to conform generally to the configuration of the supporting wheels 182 so that the rearmost edge of the plow share can extend to the greatest degree possible up to the point of contact between the supporting wheels 182 and the ground surface thereby further assuring that the point of initial contact between the mulch paper and the ground surface will be as close as possible to the widest opening of the furrows and at the point of downward pressure of the supporting wheels.

A pair of presser wheels 190 are mounted upon the axle shaft 176 so that they will rotate therewith. The presser wheels are so positioned upon the axle shaft, inboard of the supporting wheels 182 so that they are aligned with the channels 148 and therefore with the line of plants as they are fed out of the planting machine. Presser wheels 190 are preferably of somewhat less diameter than the supporting wheels 182 and are relatively soft. The function of the presser wheels 190 is to bear upon the tops of the plants as they come out of the machine and contact the ground surface, further assuring proper placement of the plants in the furrows. Pineapple slips, suckers and crowns are relatively sturdy and the downward pressure exerted by the presser wheels 190 will not damage them but will assure proper insertion of them into the soil. For plants of somewhat less sturdy nature, it may be desirable to make the presser wheels more soft and pliable. Because the presser wheels are turning at the approximate same speed as the supporting tires 182 rather than being drawn across the plants, it is not likely that the presser wheels will damage the plants.

In the center of the axle shafts 176 between the presser wheels there is mounted an additional wheel termed herein as moon wheel 192. Moon wheel 192 has a concave outer periphery 194 the purpose of which can best be seen in FIG. 3. The concave periphery of the moon wheels 192 presses firmly upon the soil and upon the mulch paper which covers it in the space between the parallel rows of plants to form a curved or crowned bed 194 between the plants. Crowned beds are also formed by the disc plows 184 on the outboard edges of each strip of mulch paper so that the resulting seed beds have crowned areas on both sides of the row of plants. This materially enhances plant growth because of enhanced moisture flow to the young plants on account of the curved surfaces. The moon wheels 192 also bearing firmly upon the mulch paper help to drive the paper out of each planting machine and compact the soil around the seeds in the same manner as do the supporting wheels 182.

Figure 4:
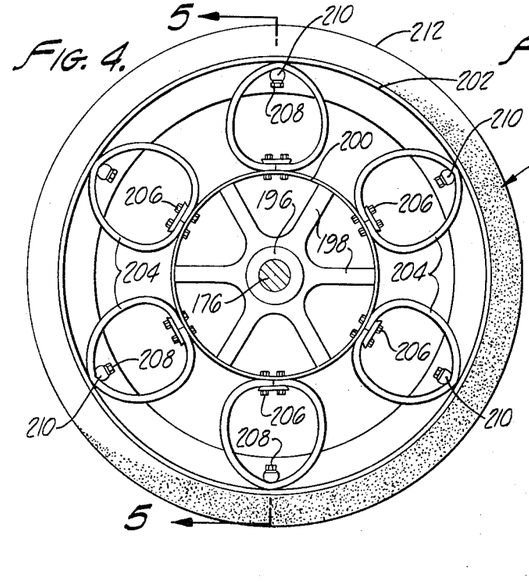
FIG. 4 is an enlarged side elevation of the moon wheel, taken along lines 4—4 of FIG. 3.
Figure 5:
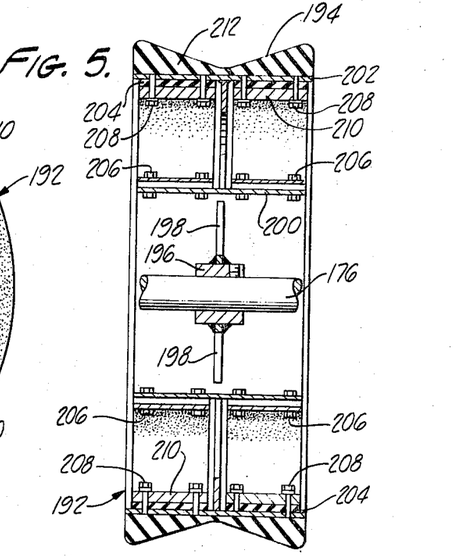
FIG. 5 is a sectional view of the moon wheel taken along line 5—5 of FIG. 4.

FIGS. 4 and 5 in the drawings disclose the manner of construction of the moon wheels. These wheels consist of a central hub 196 which is secured to the axle shaft 176. From the hub 196 extend a plurality of spider arms 198 and which are surrounded by an inner wheel 200. This combination provides a rigid inner wheel affixed to and rotatable with the axle shaft 176. An outer concentric wheel 202 is resiliently secured to the inner wheel 200 by means of a plurality of resilient loop members 204 which are secured to the inner wheel 200 by means of fasteners 206. The loop members 204 are fastened to the outer wheel 202 by means of fasteners 208 which extend through a laterally oriented cylindrical fastening member 210. The lateral cylindrical element 210 permits the flexible loop members 204 to stretch and flex about the fastener without tearing. On the outer periphery of the outer wheel 202 is provided the tread portion 212 having the cross sectional configuration shown in FIG. 5 to provide the concave outer periphery for the wheel. By so constructing the moon wheel in the manner described, the wheel will be driven at the same rate as are the supporting wheels 182 yet its ability to float about the axle shaft 176 permits it to adjust to varying terrain regardless of the ground line established by the wheels 182. By driving the moon wheels 192 at the same speed as the supporting wheels 182, all possibility of bulldozing action upon the relatively fragile mulch paper is eliminated thereby further reducing the possibility of tearing the paper as may occur if the wheels were merely dragged over the paper.

The hydraulic drive motors 178 and 180 which independently power the supporting wheels and presser wheels and each individual moon wheel of the independent planting machines 114 and 116 are driven, by means which will be more fully described subsequently, at the same rate of speed as accomplished by the prime mover. In other words, these wheels are not merely dragged along the ground but are all driven at actual ground speed which not only supports the back end of the machine but drives out the mulch paper at true ground speed without stretching or tearing the paper or bunching the paper up in such a manner as would achieve nonuniform spacing of the plants. It should also be apparent that the action of the supporting wheels to support the back end of the apparatus will also help compact the soil around the plants and this is another reason for achieving the point of plant insertion as close as possible to the point of contact between the supporting wheels and the ground surface.

An additional set of plows 214 are mounted upon the frames 118 at positions slightly ahead of the plowshares 172 but behind the plow shanks 66. These plows help to reform the soil after passage of the shanks 66 to prepare the soil for the furrow-forming plowshares 172.

Another feature of the present invention (see FIG. 11) is the capability of lifting all the soil contacting elements of the planting machines up and away from the soil so that it can be turned at the end of a row or can be taken to the field easily or can be transported across roads and the like. This is accomplished principally through the operation of hydraulic cylinder 68 which acts between the rear equipment brackets 12 and the lateral tool bar 58. Upon first actuating cylinder 68, which pulls upwardly on the tool bar 58 pivoting it about pivot point 59, the plow shanks 66 will be first partially removed from the soil. The universal couplings 122 between the tool bar 58 and the planting machines 114 and 116 will permit relative pivotal motion therebetween for a portion of the upward travel of the tool bar 58. Secured to each of the shanks 66 are lug members 216 which are so positioned as to contact the lower edge of the frames 118 as the shanks 66 are pivoted upward. Thereafter, further retraction of hydraulic cylinder 68 will operate to lift the frames 118 pivotally upwardly therewith. As the planting machines 114 and 116 are lifted upwardly, the chutes 46 will slide on pins 52 along the track 54.

Figure 9:
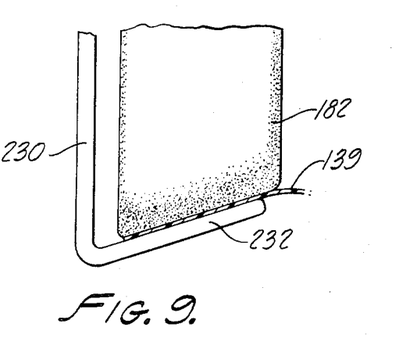
FIG. 9 is a partial sectional view taken along line 9—9 of FIG. 6 showing the details of the paper clamping arm.
Figure 11:
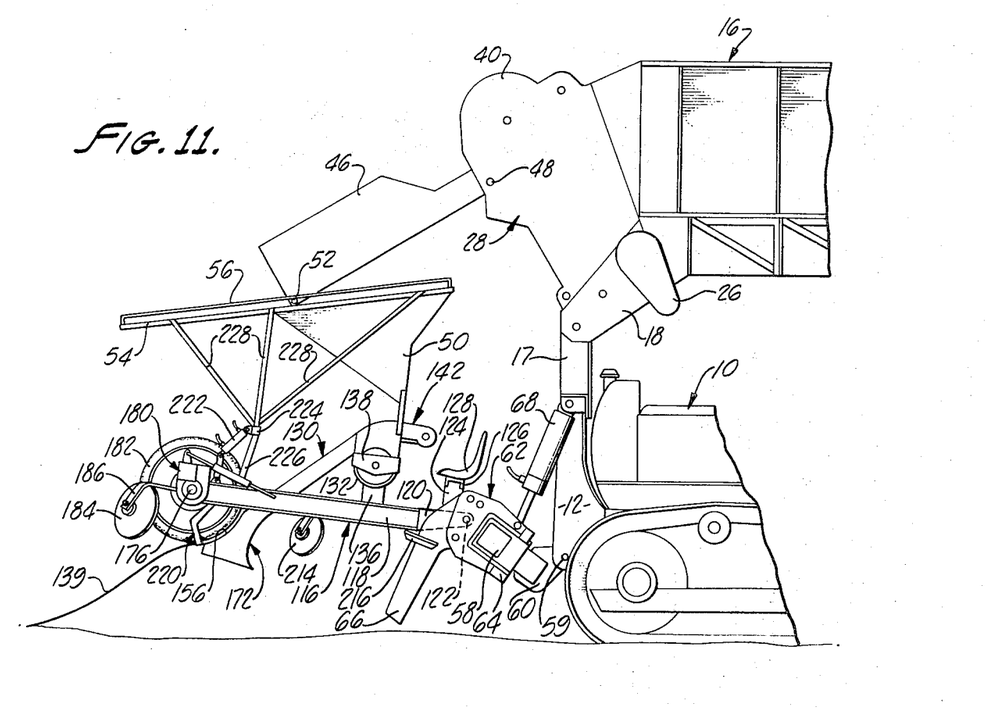
FIG. 11 is a partial side elevation showing the planting machines in the upraised position.

Whenever the supporting wheels 182 are lifted away from the soil, it is desirable to clamp onto the mulch paper 139 so that it can be cut off at the end of a row or will not otherwise continue to be paid out, and most importantly will not lose its position below the supporting wheels. For this purpose, paper clamping arms 220 are pivotally mounted to the frame 118 adjacent each supporting wheel 182. One end of clamping arm 220 is connected to an hydraulic cylinder 222 which is mounted to a lateral cross bar 224. Cross bar 224 extends laterally across but spaced above the table 130 and is so positioned by supporting arms 226. It is to this same cross bar 224 that supporting legs 228 are mounted to support the hoppers 50. The other end of arms 220 are provided with an angled portion 230 and a laterally extending portion 232. In the running position with the supporting wheels on the ground, clamping arm 220 is moved to its upraised position as may be seen in FIG. 1 with cylinder 222 extended. When the machine is to be lifted, however, cylinder 222 is retracted so that the angle arm 230 causes the laterally extending portion 232 to wedge against the outer periphery of the supporting tire 182 thereby clamping therebetween the mulch paper 139 as shown in FIGS. 9 and 11.

Figure 10:
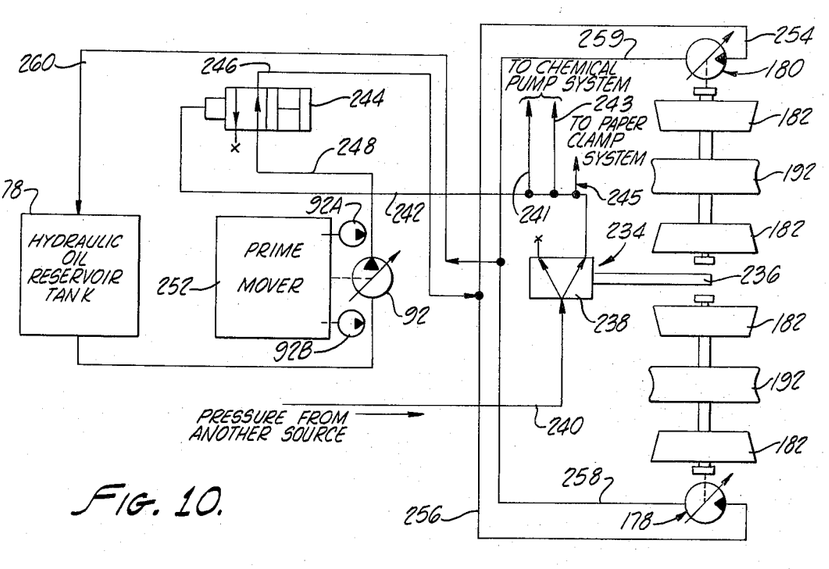
FIG. 10 is a schemmatic diagram of the hydraulic drive system.

Turning now to FIG. 10, the details of the hydraulic drive system will be described. A sensing device 234 having an arm 236 is mounted upon either one of the two frames 118 in such a position that when the supporting wheels come to rest upon the ground, arm 236 will actuate the drive mechanism to drive the wheels. Hydraulic control valve 238 receives hydraulic input through conduit 240 from any suitable pressure source. Arm 236 activates valve 238 causing fluid to flow through the outlet line 242 which is coupled to pilot pressure valve 244. Conduit 242 is also coupled to additional conduits 241, 243 and 245 connected to similar valves to drive the chemical metering pumps and to deactuate the paper clamping system, both of which were previously described. When this occurs, valve 244 opens line 246 which is coupled through input line 248 to a variable displacement, pressure-compensated hydraulic pump 92 which is driven by a groupd speed power take off 252 carried by the prime mover. Also coupled to the take-off unit are positive displacement pumps 92A and 92B which drive the two sets of chemical metering pumps mounted on each side of the prime mover. Fluid pumped by the variable displacement pump 92 will flow through lines 24B and 246 where it is distributed through lines 254 and 256 which are in turn coupled to the hydraulic drive motors 178 and 180. Return lines 258 and 259 from the hydraulic motors return fluid through line 260 to the reservoir tank 78. The hydraulic motors 178 and 180 may include speed reducers to increase the torque as necessary to drive the supporting wheels at the same ground speed as that achieved by the prime mover. The pressurized oil places a constant driving force on each set of support wheels assuring a true ground speed for each set of wheels. For the wheels to move faster than ground speed, the wheels must either lose traction or move the prime mover. Since the prime mover is relatively massive, it is unreasonable to suppose that the wheels could force the prime mover to move so hydraulic pressure to the drive motors is set somewhat lower than that point at which the wheels lose traction. Thus, the wheels are under a pressurized "semi-stalled" condition. Whenever the prime mover moves faster the wheels will turn faster. And, whenever the prime mover goes in other than a straight path, those set of wheels on the outside of the turn will turn faster, drawing more oil, and the inside wheels will turn slower, drawing less oil, automatically achieving a differential drive system. The pump 92 is sized so that there will always be an adequate reserve capacity of oil that can be drawn at demand. Thus, an approximately true ground speed is obtained with the hydraulic drive system even when not traveling in a straight path. Similar control signals are piped to the chemical and the paper clamping circuits thru conduits 241, 243 and 245. Since power to the variable displacement pump and the positive displacement pumps are derived from a power takeoff coupled to the prime mover, whenever the prime mover stops, the supporting wheel drive system and the chemical pumping system are also stopped. Whenever the supporting wheels are raised off the ground, the actuating arm 236 will shift valve 238 which will close valve 244 stopping rotation of the wheels. This will also shut off power to the chemical pumping system and will actuate the paper clamps. Thus the prime mover can travel with the planter raised as all planting functions are automatically stopped.

The supporting tires, as previously mentioned, have four functions, first of all they support the back end of the machines and the close association thereof to the plowshares 172 guages those plows to open furrows of uniform depth regardless of varying terrain. Uniform planting depth is fundamental to good plant culture. The tires also drive out the paper at true ground speed as accomplished through the hydraulic drive system and because true gound speed is accomplished as the mulch paper is laid on the soil, stretching or bunching of the paper will be unlikely to occur. The wheels also form a tuck at the edge of the paper to improve soil cover. Finally, the supporting wheels compact the soil around the plants. The hydraulic drive to the supporting wheels compensates for skidding or traction loss that always occurs with the prime mover and also compensates for nonlinear planting beds. This nonlinearity has been in the past most difficult to compensate for where two machines are used, but the particular drive system of the present invention has successfully accomplished this goal. The plow shanks have three functions; injecting chemicals into the soil at a predetermined depth, softening the soil after it is compacted by the prime mover, and engaging the planting machines for lifting.

While particular embodiments of the invention have been shown and described in detail herein, it will be obvious to persons skilled in the art that changes and modifications might be made without departing from this invention in its broader aspects. It is the aim to cover all such changes, modifications and equivalents as fall within the true scope of this invention.

I claim:

1. A system for continuously planting small plants in multiple rows, comprising:
    a planting machine, means affixed to said machine for forming furrows in the soil in spaced parallel rows
    a quantity of mulch paper situated upon said planting machine in the form of a con-tinuous strip, said strip having a plurality of apertures therein for receiving said small plants, said apertures being oriented is spaced parallel rows;
    means attached to said machine for continuously feeding said mulch paper from said machine onto the ground, said feeding means including guide means for guiding said paper into contact with the ground at points immediately behind said furrow forming means, a plurality of wheels mounted at the rear of said machine, said wheels being spaced laterally with respect to said furrow forming means and bearing upon the soil adjacent said furrows so as to firm the soil around said furrows, said guide means being oriented with respect to said wheels so as to guide said mulch paper beneath said wheels, drive means coupled to said wheels for driving said machine forwardly; and
    means mounted on the rear of said machine for back filling said furrows and for covering the edges of said paper with soil.

2. The system set forth in claim 1, wherein:
    said feeding means comprises one or more planting machines having means for feeding a continuous strip of mulch paper onto the ground, said mulch paper being prepunched with a plurality of apertures for receiving plants therein, said apertures being aligned along said strip to form spaced parallel rows;
    said furrow forming means including first plow means mounted upon said planting machine, said plow means being substantially aligned with said apertures in said paper, said first plow means being situated upon said planting machine to form said furrows immediately ahead of the point at which said mulch paper first contacts the ground surface;
    said paper holding means comprising a plurality of wheels mounted upon the rear of said planting machine for supporting said machine at the rear thereof, said wheels being situated to ride upon said mulch paper as said paper is fed out, means for driving said wheels to move said planting machine in a forward direction, means for coupling said machine to a prime mover, means responsive to the rate of advance of a prime mover, means coupling said responsive means to said drive means for controlling the driven speed of said wheels;
    said soil firming means comprising wheels mounted at the rear of said planting machine, said wheels being mounted with respect to the said furrow forming means so as to be aligned with the edges of the furrows; and
    said back filling means comprising second plow means mounted upon the rear of said machine aligned outside of said wheels to close said furrows and cover the edges of said paper with soil.

3. A system for continuously planting small plants in multiple rows, comprising:
    one or more planting machines having paper feeding means for feeding a continuous strip of mulch paper onto the ground, said mulch paper having a plurality of apertures for receiving said plants therein, said apertures being aligned along said strip to form spaced parallel rows, said planting machine including first plow means for forming spaced parallel furrows, said first plow means being substantially aligned with the apertures in said paper, second plow means affixed to the rear of said planting machine for covering the edges of said paper strip with soil;
    drive means for moving said planting machine in a for-ward direction, said drive means including a plurality of wheels for supporting said planting machine at the rear thereof, said planting machine further provided with coupling means for coupling said machine to a prime mover whereby the front thereof is supported, means responsive to the rate of advance of the prime mover over the ground, said responsive means coupled to motor means for driving said supporting wheels whereby said planting means is driven at the same speed as said prime mover;
    seed bed forming means coupled to the rear of said plant-ing machine and between said supporting wheels for forming the soil between said rows into a crown;

delivery means coupled to said paper feeding means for delivering a quantity of plants thereto; and means coupled to said planting machine for injecting fumigants and fertilizers beneath the soil level.

4. The system set forth in claim 3 wherein said seed bed forming means comprises:

at least one moon wheel mounted at the rear of each said planting machine between said supporting wheels, said moon wheels being coupled to said supporting wheels and driven simultaneously therewith, said moon wheel being resiliently mounted for relative motion with respect to said supporting wheels, said moon wheel having a concave peripheral tread surface.

5. The system set forth in claim 3 wherein said paper feeding means includes means for feeding mulch paper beneath said rear supporting wheels, said supporting wheels being stationed so as to engage the edges of said paper whereby said wheels as they are driven forwardly draw the mulch paper out onto the ground.

6. The system set forth in claim 3 wherein said feeding means comprises:

a feed table having a loading section and a ramp section, parallel longitudinal channels formed in said table, the apertures in said mulch paper adapted to align with said channels, said channels having closed bottoms spaced a pre-determined distance below the surface of the feed table whereby plants inserted through the paper apertures will always be inserted to the same extent.

7. The system set forth in claim 6 wherein:

said ramp section of said feed table extends downwardly toward the rear of said planting machine directed generally at the point at which the supporting wheels contact the ground, said feed table terminating a spaced interval ahead of said supporting wheels, said channels being extended in the same general direction each forming a plowshare, the side walls of said channels extending backwardly beneath the ground to a point below and adjacent the point of contact between the supporting wheels and the ground;

means for feeding said mulch paper over the surface of said feed table along the edges of the channel side walls and beneath said rear supporting wheels, said supporting wheels being spaced so as to engage the edges of said paper whereby said wheels as they are driven forwardly draw the paper out of the feeding means and onto the ground.

8. The system set forth in claim 3 wherein said drive means comprises a variable displacement hydraulic pump, means coupled to said pump for driving said pump in response to forward movement of a prime mover to which said planting means is coupled, an hydraulic motor coupled to the supporting wheels of each of said planting machines, first conducting means coupling said pump to each hydraulic motor, an hydraulic reservoir, second conducting means coupled between each said hydraulic motor and said reservoir providing a fluid return path, said pump having means for adjusting the output pressure thereof to a predetermined level, valve means in said first conducting means operative to control the flow of fluid therein to said motor means, and switch means coupled to said valve means, said switch means including detecting means responsive to the position of said planting means whereby said switch means is actuated when said planting means is resting upon the ground to open said valve means.

9. The system set forth in claim 3 further including a supporting bracket, means for coupling said bracket to a prime mover, means for pivotally coupling said planting machine to said bracket, lifting means coupled between said bracket and said planting machine for pivotally lifting said machine to a position whereby said supporting wheels and said plow means are spaced above ground level.

10. The system set forth in claim 9 further including clamping means mounted upon each said planting machine, said clamping means comprising a pivotal arm, means for moving each said arm into and out of engagement with a surface of each said supporting wheel whereby said mulch paper may be clamped firmly against said supporting wheel when said planting machine is to be lifted to an upraised position.

11. The system set forth in claim 3 wherein said delivery means comprises a seed bin, means for mounting said seed bin upon a prime mover, hopper means mounted upon each of said planting means, conveyor means coupled to said seed bin for conveying seeds from said bin to each of said hoppers, and drive means coupled to said conveyor means for driving said conveyor means to move individual ones of said seeds from said bin to said hoppers.

12. The system set forth in claim 4 further including a pair of presser wheels mounted at the rear of each said planting machine between said supporting wheels and said moon wheel, said presser wheels being coupled to said other wheels and rotatably driven therewith, said presser wheels having a soft resilient peripheral surface, said presser wheels being substantially aligned with the apertures provided in said mulch paper.

13. The system set forth in claim 4 wherein said moon wheel comprises a central hub having a plurality of radial arms, an inner wheel affixed to said arms, a rigid outer wheel having a diameter greater than said inner wheel, a plurality of resilient coupling members affixed between the outer surface of said inner wheel and the inner surface of said outer wheel whereby the center of rotation of said outer wheel is capable of relative motion with respect to the center of rotation of said inner wheel, and a tread member affixed to the outer surface of said outer wheel, said tread member having a concave peripheral surface.

14. The system set forth in claim 3 further including a plurality of plow shanks coupled to each said planting machine, the number of said plow shanks corresponding to the number of rows of apertures in said mulch paper, said shanks being positioned in alignment with each of said rows, said shanks having a plurality of conduits therein and a corresponding number of apertures positioned near an end of said shank, means coupling a supply of fumigant and fertilizer materials to said conduits, and means for pumping said fumigants and fertilizer through said conduits in metered amounts.

15. A system for continuously planting small plants in multiple rows, comprising:

a pair of planting machines stationed in side-by-side relationship, the front of each machine adapted to be pivotally coupled to a prime mover, drive means for moving said machines in a forward direction comprising a pair of supporting wheels mounted upon the rear of each said machine, motor means coupled to each pair of said supporting wheels, means responsive to the rate of advance of said prime mover, said responsive means coupled to said motor means, and differential control means coupled to said motor means for controlling the rate of drive of each of said motor means;

each of said planting machines further including a feed table, a strip of mulch paper, means for feeding said strip of mulch paper over said table and onto the ground, longitudinal channels formed in said table in spaced parallel relationship, said mulch paper having a plurality of apertures for receiving plants therein, said apertures being aligned along said strip in spaced paralled rows registering with said channels, said channels having closed bottoms spaced a predetermined distance below the surface of said table whereby plants inserted through the paper apertures will always be inserted to the same extent.

16. The system set forth in claim 15 wherein said feed table further includes:

a ramp section and a loading section, said ramp section extending downwardly toward the rear of said planting machine directed generally at the point at which the supporting wheels contact the ground surface, said feed table terminating a spaced interval ahead of said supporting wheels, said channels having the side walls thereof extending in the same general direction as said ramp section beyond the terminus of said table and each forming a plowshare, the side walls extending to a point below and adjacent the point of contact between said supporting wheels and the ground, said mulch paper feeding over said table surface down said ramp section along said channel side walls and under said supporting wheels, said supporting wheels being spaced so as to engage the edges of said paper whereby said wheels as they are driven forwardly draw the paper out of said paper feeding means and onto the ground.

17. The system set forth in claim 16 further including means mounted upon said feed table for stretching said paper laterally across said table sections.

18. The system set forth in claim 16 further including:

seed bed forming means coupled to the rear of each said planting machine, said seed bed forming means including a moon wheel mounted between said supporting wheels, said moon wheel having a concave peripheral tread surface, said moon wheel being coupled to said supporting wheels and rotatably driven therewith, and second plow means affixed to the rear of each said planting machine for covering the edges of said paper strip with soil.

19. The system set forth in claim 18 wherein said moon wheel comprises a central hub having a plurality of radial arms, an inner wheel affixed to said arms, a rigid outer wheel having a diameter greater than said inner wheel, a plurality of resilient coupling members affixed between the outer surface of said inner wheel and the inner surface of said outer wheel whereby the center of rotation of said outer wheel is capable of relative motion with respect to the center of rotation of said inner wheel, and a tread member affixed to the outer surface of said outer wheel, said tread member having a concave peripheral surface.

20. The system set forth in claim 18, further including a supporting bracket, means for coupling said bracket to a prime mover, means for pivotally coupling said planting machine to said bracket, lifting means coupled between said bracket and said planting machine for pivotally lifting said machine to a position whereby said supporting wheels and said plow means are spaced above ground level.

21. The system set forth in claim 20, further including clamping means mounted upon each said planting machine, said clamping means comprising a pivotal arm, means for moving each said arm into and out of engagement with a surface of each said supporting wheel whereby said mulch paper may be clamped firmly against said supporting wheel when said planting machine is to be lifted to an upraised position.

22. The system set forth in claim 21 further including:

delivery means adapted to be mounted upon said prime mover, said delivery means including a hopper mounted upon each said planting machine above the loading section of said feed table, a seed bin for containing a quantity of said small plants, and conveyor means for conveying said plants from said bin to said hoppers.

23. The system set forth in claim 22 further including means coupled to each said planting machine for injecting fumigants and fertilizer into the soil at a point ahead of the point of contact between said supporting wheels and the ground surface.

24. The system set forth in claim 18 further including a pair of presser wheels mounted at the rear of each said planting machine between said supporting wheels and said moon wheel, said presser wheels being coupled to said other wheels and rotatably driven therewith, said presser wheels having a soft resilient peripheral surface, said presser wheels being substantially aligned with the channels formed in said feed table.

* * * * *